United States Patent
Kam et al.

(10) Patent No.: US 12,301,986 B2
(45) Date of Patent: May 13, 2025

(54) TAMPER REDUCTION FOR QUICK DEPLOY CAMERA SYSTEM

(71) Applicant: MOTOROLA SOLUTIONS, INC., Chicago, IL (US)

(72) Inventors: Danny Kam, Vancouver (CA); Patrick D. Koskan, Jupiter, FL (US); Pietro Russo, Melrose, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 390 days.

(21) Appl. No.: 18/147,638

(22) Filed: Dec. 28, 2022

(65) Prior Publication Data

US 2024/0223892 A1    Jul. 4, 2024

(51) Int. Cl.
*H04N 23/65*   (2023.01)
*G06T 7/20*    (2017.01)
*G06V 10/74*   (2022.01)
*H04N 23/667*  (2023.01)

(52) U.S. Cl.
CPC ............ *H04N 23/651* (2023.01); *G06T 7/20* (2013.01); *G06V 10/761* (2022.01); *H04N 23/667* (2023.01); *G06T 2207/30196* (2013.01); *G06T 2207/30252* (2013.01); *G06V 2201/07* (2022.01)

(58) Field of Classification Search
CPC .... H04N 23/651; H04N 23/667; H04N 23/65; G06T 7/20; G06T 2207/30196; G06T 2207/30252; G06V 10/761; G06V 2201/07; G06V 20/52
See application file for complete search history.

(56) References Cited

U.S. PATENT DOCUMENTS

| | | | |
|---|---|---|---|
| 10,062,251 B2 | 8/2018 | Kasmir et al. | |
| 10,421,437 B1* | 9/2019 | Koskan | G08B 21/0261 |
| 10,460,582 B2 | 10/2019 | Anderholm et al. | |
| 11,002,827 B2 | 5/2021 | Blanco et al. | |
| 11,016,190 B2* | 5/2021 | Koskan | G01S 13/42 |

(Continued)

OTHER PUBLICATIONS

Axis Technical Support Videos, "Handling Zones, Crosslines and Opacity in an Axis Security Radar," published on Nov. 16, 2018, <https://www.youtube.com/watch?v=mXM4csSMOBU> (1 page).

(Continued)

*Primary Examiner* — Abdelaaziz Tissire
(74) *Attorney, Agent, or Firm* — Michael Best & Friedrich LLP

(57) ABSTRACT

Methods and systems for tamper reduction for camera systems. One example system includes a camera with a first field of view configured to operate in a low-power mode and an active mode, an energy wave sensor with a second field of view, and an electronic processor. The electronic processor is configured to monitor, via the energy wave sensor, for an object within the second field of view and determine an object type of the object. In response to determining that the object type is a vehicle, the electronic processor transitions the camera from the low-power mode to the active mode and captures, via the camera, an image of the vehicle. In response to determining that the object type is a person, the electronic processor performs a tamper-monitoring action when the person is within a first predetermined range of a plurality of predetermined ranges of the system.

20 Claims, 4 Drawing Sheets

(56) References Cited

U.S. PATENT DOCUMENTS

| | | | |
|---|---|---|---|
| 2003/0041329 A1* | 2/2003 | Bassett | H04N 7/185 |
| | | | 348/148 |
| 2004/0140885 A1* | 7/2004 | Slicker | B60R 25/305 |
| | | | 340/426.1 |
| 2007/0055446 A1* | 3/2007 | Schiffmann | G01S 13/867 |
| | | | 701/301 |
| 2008/0259162 A1* | 10/2008 | Aoki | H04N 7/181 |
| | | | 348/E7.086 |
| 2010/0085173 A1* | 4/2010 | Yang | G08G 1/166 |
| | | | 382/106 |
| 2010/0134264 A1* | 6/2010 | Nagamine | B60Q 9/005 |
| | | | 348/113 |
| 2012/0147531 A1* | 6/2012 | Rabii | H04W 52/0254 |
| | | | 361/679.01 |
| 2013/0141587 A1 | 6/2013 | Petricoin, Jr. et al. | |
| 2018/0072270 A1* | 3/2018 | Renaud | H04N 7/181 |
| 2019/0096205 A1 | 3/2019 | Blech et al. | |
| 2019/0120934 A1* | 4/2019 | Slutsky | G01S 13/931 |
| 2020/0193166 A1 | 6/2020 | Russo et al. | |
| 2020/0320309 A1* | 10/2020 | Nagata | G08B 31/00 |
| 2022/0153232 A1* | 5/2022 | Gallagher | A61G 3/062 |
| 2023/0186630 A1* | 6/2023 | Joseph | H04N 7/18 |
| | | | 348/224.1 |

OTHER PUBLICATIONS

Smartmicro, "Smartmicro Sensors for Traffic Management," accessed on Nov. 18, 2022 <https://www.smartmicro.com/traffic-radar> (19 pages).

Smartmicro, "Product Information: Traffic Management Sensor," accessed on Nov. 18, 2022 <https://www.smartmicro.com/fileadmin/media/Downloads/Traffic_Radar/Sensor_Data_Sheets_24_GHz_/UMRR_Traffic_Sensor_Type_44_Data_Sheet.pdf> (17 pages).

* cited by examiner

TAMPER REDUCTION FOR QUICK DEPLOY CAMERA SYSTEM

BACKGROUND OF THE INVENTION

Public safety agencies, for example law enforcement agencies, use security systems (for example, a camera or video security system) to monitor and record activity in various areas. Video and audio information recorded by a camera (and an associated microphone) is often useful for detecting a public safety incident (for example, a robbery, a fire, vandalism, etc.) and in the subsequent investigation the incidents. Commercial operators may also use security systems to monitor their properties or other points of interest (for example, an access point) to detect entities entering or approaching a property and monitor activity at the property. Such systems may be used in gated entryways to neighborhoods and building sites, for example, to control and monitor entry and departure.

Cameras are often installed on poles and structures in a manner that is intended to be permanent. In some instances, a temporary security system is installed at a particular location, for example, at a street intersection with a high rate of vehicle accidents. In such instances, a public safety agency or commercial entity may utilize one or more portable "quick-deploy" camera systems to capture image information at the location.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1A:
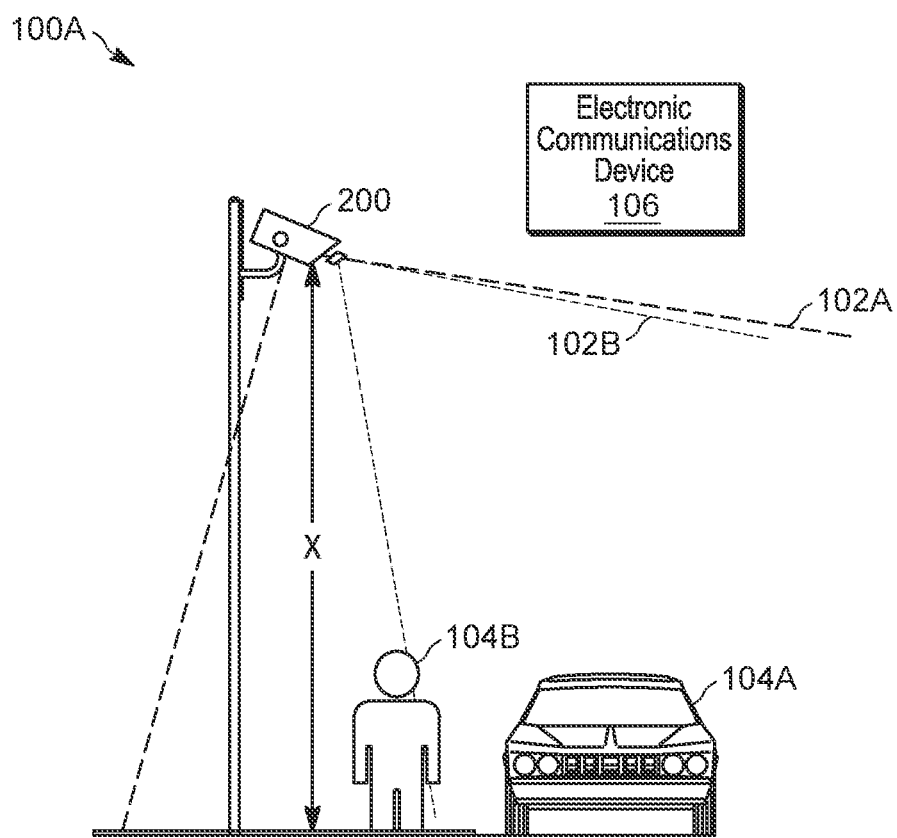
FIG. 1A is a diagram of a security system from a side view perspective in accordance with some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various examples.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

DETAILED DESCRIPTION OF THE INVENTION

As noted above, public safety agencies, commercial entities, and others may utilize one or more portable, quick-deploy camera systems to implement an image security system (for example, temporarily) to monitor and capture images (or video) and sometimes audio (if the camera has a microphone) at a location of interest.

In some instances, a quick-deploy camera system includes a camera that is configured to automatically capture images in response to detecting motion of and/or a presence of an object within a field of view (FOV) of the device. The captured images may be stored on the device itself or transmitted (for example, via a cellular or other wireless link) to another electronic device (for example, a server or a portable electronic communications device). A quick-deploy camera system may be configured to operate in a standby (low power) mode while no object or motion from an object within the FOV is detected and transition into an active (higher or full power) mode to capture images of the object as necessary.

Some quick deploy camera systems are mounted (for example, on a tree, a pole (e.g., a telephone pole, street pole, electrical pole, etc.), on a building, on a gate, etc.) at a certain elevation above the ground, for example, to capture a desired FOV. While mounting a camera system at an elevated position may make it difficult for a person to reach the camera system (for example, approximately 10 to 20 feet off the ground), a person may still attempt to tamper with the camera system (for example, deactivate and/or steal the camera). Any damage to or theft of the camera system is not only expensive but may also result in a loss of important recorded information.

These and other related problems in the field can be beneficially addressed using at least some embodiments, examples, aspects, and features disclosed herein. Various examples provide a camera system that, among other things, monitors, via a secondary sensor, a FOV of the camera system and performs one or more actions to prevent unauthorized tampering with the camera system.

One example provides a portable deployable camera system. The system includes a camera with a first field of view. The camera is configured to operate in a low-power mode and an active mode. The system also includes an energy wave sensor with a second field of view that is different than the first field of view, and an electronic processor. The electronic processor is configured to monitor, via the energy wave sensor, for an object within the second field of view and determine an object type of the object. In response to determining that the object type of the object is a vehicle, the electronic processor transitions the camera from the low-power mode to the active mode and captures, via the camera, an image of the vehicle. In response to determining that the object type of the object is a person, the electronic processor performs a tamper-monitoring action when the person is within a first predetermined range of a plurality of predetermined ranges of the system.

Another example provides a method for reducing tampering of a portable deployable camera system. The camera system includes a camera with a first field of view. The camera is configured to operate in a low-power mode and an active mode. The camera system also includes an energy wave sensor with a second field of view that is different than the first field of view. The method includes monitoring, via the energy wave sensor, for an object within the second field of view and determining an object type of the object. The method further includes, in response to determining that the object type of the object is a vehicle, transitioning the camera from the low-power mode to the active mode and capturing, via the camera, an image of the vehicle. In response to determining that the object type of the object is a person, the camera system performs a tamper-monitoring action when the person is within a first predetermined range of a plurality of predetermined ranges of the system.

For ease of description, some or all of the examples, aspects, and features presented herein are illustrated with a single exemplar of each of its component parts. Some examples may not describe or illustrate all components of the systems. Other examples may include more or fewer of each of the illustrated components, may combine some components, or may include additional or alternative components. For example, although the example systems and methods described herein are described in terms of a single camera system and electronic communications device, it should be understood that, in some instances, the system may include more than one camera system or electronic communications devices. It should also be understood that although the examples described herein are in terms of being utilized by public safety agencies, the systems and methods described herein may be utilized by other agencies (for example, other kinds of public and/or private entities).

It should be understood that although certain figures presented herein illustrate hardware and software located within particular devices, these depictions are for illustrative purposes only. In some instances, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1A is a block diagram of an image security system 100A (from a side view) in accordance with some examples. The system 100A includes a portable camera system 200 that includes an energy wave sensor 245A and a camera 245B (both of which are illustrated and described in more detail below in regard to FIG. 2). In the example illustrated, the portable camera system 200 is mounted at a vertical distance "x" from the ground (for example, on a tree, a pole, or another structure). The vertical distance x may be, for example, approximately 10 ft-35 ft.

Figure 1B:
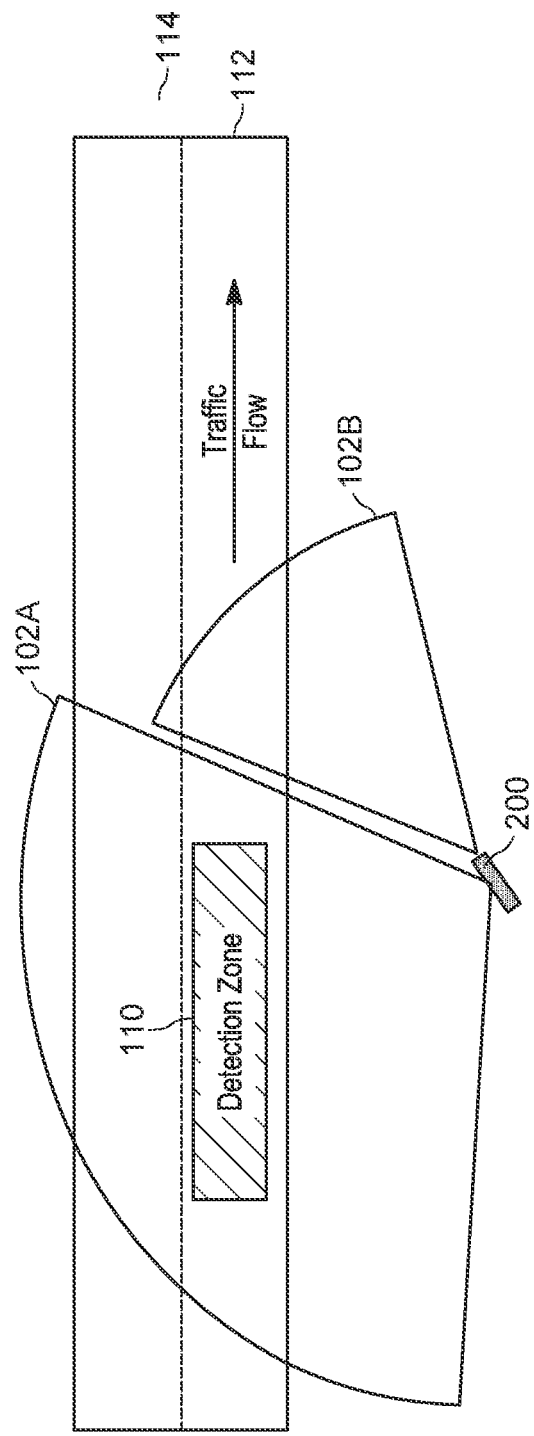
FIG. 1B is another diagram of the security system of FIG. 1A from a top-down perspective in accordance with some aspects.

The energy wave sensor 245A and the camera 245B each have a different FOV 102A and 102B, respectively. In some instances, the FOV 102B is referred to as a "first" FOV and the FOV 102A is referred to as a "second" FOV. The labels "first" and "second" are used to differentiate the two fields of view, but other labels are possible, for example, an "energy wave sensor" FOV and a "camera" FOV. In FIG. 1B, "radar" FOV and "camera" FOV are used and the figure illustrates an example where a radar is used. As explained below, various energy wave sensors may be used.

As illustrated in FIG. 1A, the FOV 102A of the energy wave sensor 245A is wider than the FOV 102B of the camera 245B. As illustrated in FIG. 1B, which is a top-down view of the image security system 100A of FIG. 1A, the FOV 102A is centered along an axis that is different from an axis that the FOV 102B is centered along.

The energy wave sensor 245A operates at a lower voltage than the camera 245B. As explained in more detail below, the camera system 200 is configured to operate the camera 245B in a low-power mode (for example, to conserve energy stored in an energy store (for example, a battery) used by the system 200) while the energy wave sensor 245A is operated in an active mode until an object of interest enters or is within the FOV 102A of the energy wave sensor 245A of the system 200. The camera system 200 is configured to transition the camera 245B into an active mode to capture an image of the object, in response to detecting the object (or a particular object type of the object).

The FOV 102A is positioned such that the system 200 is able to detect objects within the FOV 102A that are moving towards the FOV 102B of the camera 245B. For example, as illustrated in FIG. 1B, although the energy wave sensor 245A and the camera 245B are at approximately the same elevation from the ground, the FOV 102A of the energy wave sensor 245A is approximately perpendicular to the FOV 102B of the camera 245B. Such a configuration may be utilized, for example, to detect an object (for example, a vehicle 104A) traveling toward or about to enter the FOV 102B. The system 200, in response, may then transition (depending on the object type of the object) the camera 245B into the active mode (for example, prior to the object entering the FOV 102B) to obtain visible and/or more accurate images about the object than what the sensor 245A obtains. The visible or more accurate images may include, for example, color images, infrared images, images of higher resolution, video of higher frame rate, etc.). It should be understood that although the FOV 102A is illustrated as being approximately perpendicular to the FOV 102B, that the FOV 102A may be sized and positioned in other ways to detect objects approaching the FOV 102B from one or multiple side(s) of the FOV 102B. For example, the FOV 102A may be aligned to overlap with the FOV 102B such that the two fields of view share approximately the same center axis. The FOV 102A may also be sized a predetermined amount larger than the FOV 102B.

The security system 100A may also include an electronic communications device 106 communicatively coupled to the camera system 200 and configured to receive data from and transmit data to the camera system 200 in addition to, in some examples, one or more external systems, networks, or devices. The electronic communications device 106 is an electronic device capable of operating as described herein. The electronic communications device 106 may be a portable device associated with a particular user (for example, a mobile two-way radio, a smartphone, a smart watch, a laptop computer, a tablet computer, or other similar device). The electronic communications device 106 may be a server (for example, a security management server) configured to manage a plurality of other camera systems (not shown) in addition to the camera system 200.

In various examples, communications between various components of the system 100A, including the camera system 200 and, in the illustrated example, the device 106, and the external systems, networks, or devices are performed via one or more communication networks or links, including various wired and wireless networks and links, for example, a cellular network, a land mobile radio network, a trunked radio network, a wide area network (such as, for example, the Internet), a local area network (such as, for example, a Wi-Fi network), a short-range wireless network or connection (for example, a Bluetooth network), or a combination of the same. In some specific examples, the camera system 200 is configured to communicate with different external systems, networks, or devices using different respective communication links. For example, the camera system 200 may communicate with one external device over a local area network (for example, another camera system and/or electronic communications device) and may communicate with another external device over a wide area network.

The camera system 200, as mentioned above, exchanges data with the electronic communications device 106. For example, the camera system 200 is configured to provide, among other things, images or video, captured by the camera 245B, to the electronic communications device 106. The electronic communications device 106 includes software and hardware (for example, video processors and object classifier algorithms) to electronically detect and classify objects within images and video captured by the camera 245B and the sensor information captured by the energy wave sensor 245A. The electronic communications device 106 may utilize this information to extract details, via one or more object classification/image recognition processes, for example, regarding an incident. For example, the electronic communications device 106 may determine, from the images, information such as a vehicle license plate, a vehicle model, a suspect identity, and the like. The electronic communications device 106 may, as described below, be configured to display the information received from the camera system 200 on a display.

Figure 2:
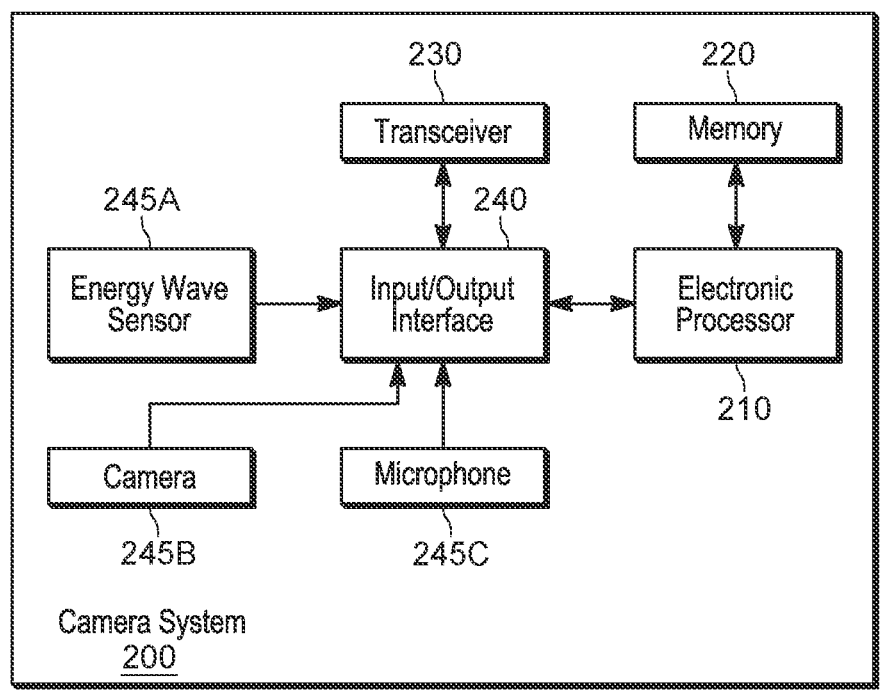
FIG. 2 is a block diagram illustrating a portable deployable camera system used in the system of FIG. 1 in accordance with some aspects.

FIG. 2 schematically illustrates one example of the camera system 200. In the example illustrated, the camera system 200 includes an electronic processor 210, a memory 220, a transceiver 230, and an input/output interface 240. The electronic processor 210, the memory 220, and the input/output interface 240 communicate over one or more control and/or data buses. FIG. 2 illustrates only one example of a camera system 200. The camera system 200 may include more or fewer components and may perform functions other than those explicitly described herein.

In some instances, the electronic processor 210 is implemented as a microprocessor with separate memory, such as the memory 220. In other instances, the electronic processor 210 may be implemented as a microcontroller (with memory 220 on the same chip). In other instances, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the camera system 200 described herein. The memory 220 may include, for example, a program storage area and a data storage area. The program storage area and the data storage area may include combinations of different types of memory, such as read-only memory and random-access memory.

The transceiver 230 enables wireless communication from the camera system 200 to, for example, the electronic communications device 106 (via a communications network) and/or other devices of the system 100A. In other instances, rather than the transceiver 230, the camera system 200 may include separate transmitting and receiving components, for example, a transmitter, and a receiver. In yet other instances, the camera system 200 may not include a transceiver 230 and may communicate with the components of the system 100A via a network interface and a wired connection to the communications network.

As noted above, the camera system 200 may include the input/output interface 240. The input/output interface 240 may be connected to one or more input mechanisms (for example, a touch screen, a keypad, a button, a knob, a microphone, sensors, and the like), one or more output mechanisms (for example, a display, a printer, a speaker, and the like), or a combination of the same. The input/output interface 240 receives input or signals from input devices, for example, actuated by a user, and provides output or signals to output devices. In some instances, as an alternative or in addition to managing inputs and outputs through the input/output interface 240, the camera system 200 may receive user input, provide user output, or both by communicating with an external device, such as the electronic communications device 106, over a wired or wireless connection.

In the example shown, the camera system 200 includes one or more sensors including the energy wave sensor 245A, the camera 245B, and a microphone 245C. The energy wave sensor 245A is a sensor configured to detect objects (and motion thereof) within a FOV (for example, as described herein, the FOV 102A) based on one or more characteristics of electromagnetic or acoustic waves (for example, a frequency, a magnitude, etc.) received at a receptor (not shown) of the sensor 245A that have been reflected off of a respective object (in particular, a surface thereof). The energy wave sensor 245A may include an emitter (or source), which is also not shown, that emits electromagnetic waves including particular characteristics to compare to the reflected waves received at the receptor. The energy wave sensor 245A may be, for example, a light-based sensor (for example, a photoelectronic sensor, visible light sensor, infrared sensor, lidar sensor, etc.), a sound-based sensor (for example, an ultrasonic sensor), a radar sensor, etc. In some examples, the energy wave sensor 245A incorporates more than one kind of energy wave sensor.

The camera 245B is configured to capture images within a FOV (for example, as described above, the FOV 102B). It should be noted that the terms "image" and "images," as used herein, may refer to one or more digital images captured by the camera 245B and/or processed by the electronic processor 210 and/or the electronic communications device 106. Further, the terms "image" and "images," as used herein, may refer to still images or sequences of images (for example, video).

The camera system 200 also includes additional components (for example, a power supply including, for example, at a battery, a solar panel, or a combination of the same. In some cases, different devices, for example, capacitors, small-scale fuel cells, etc. may be used. In some instances, the camera system may be configured so that a solar panel charges an on-board battery.

Figure 3:
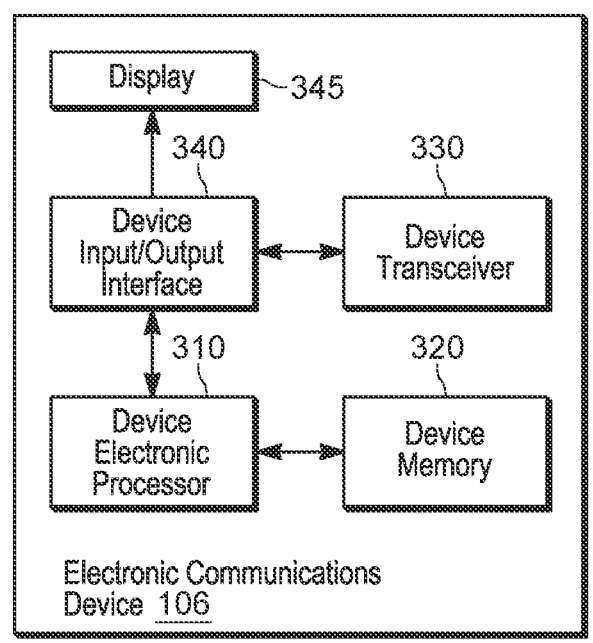
FIG. 3 is a block diagram illustrating an electronic communications device used in the system of FIG. 1 in accordance with some aspects.

FIG. 3 illustrates an example of the electronic communications device 106. In the example shown, the electronic communications device 106 includes a device electronic processor 310, a device memory 320, a device transceiver, and a device input/output interface 340. The device electronic processor 310, the memory 320, the transceiver 330, and the input/output interface 340 communicate over one or more control and/or data buses. FIG. 3 illustrates only one example of an electronic communications device 106. The electronic communications device 106 may include more or fewer components and may perform functions other than those explicitly described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein.

The device transceiver 330 enables wireless communication between the electronic communications device 106 and one or more other devices (for example, the camera system 200). In other instances, rather than a device transceiver 330, the electronic communications device 106 may include separate transmitting and receiving components, for example, a transmitter and a receiver.

The device input/output interface 340 may connect to one or more input mechanisms (for example, a camera, a microphone, a touch screen, a keypad, a button, a knob, a push-to-talk (PTT) selection mechanism, and the like), one or more output mechanisms (for example, a display, a speaker, and the like), or a combination thereof.

In the example illustrated, the input/output interface 340 includes a display 345. In some instances, the electronic communications device 106 includes software to generate a graphical user interface (GUI) (for example, generated by the device electronic processor 310, from instructions and data stored in the memory 320, and presented on the display 345), that enables a user to interact with the device 106.

As noted, quick deploy camera systems (for example, the camera system 200), may be susceptible to tampering. As also noted, it may be desirable to reduce power consumption of such cameras when they are not actively capturing specified objects of interest. Some camera systems described herein (for example, the camera system 200) utilize a low power consumptive (for example, approximately 5-12 volts) energy wave sensor (for example, the energy wave sensor 245A) to monitor for potential attempts by a person to tamper with the camera system 200.

Figure 4:
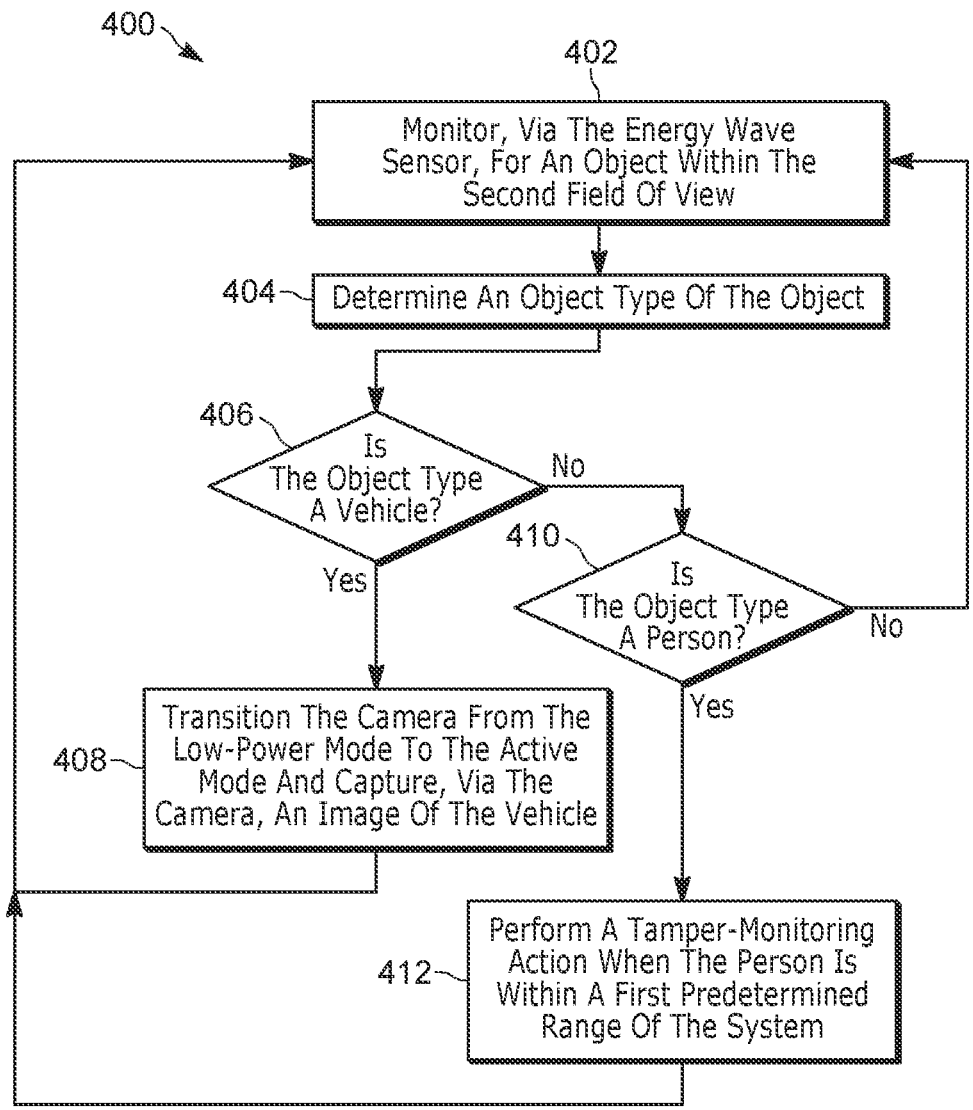
FIG. 4 is a flowchart illustrating a method for tamper prevention or reduction of the portable deployable camera system of FIG. 2 in accordance with some aspects.

FIG. 4 illustrates an example method 400 for preventing or reducing tampering of a portable deployable camera system in accordance with some examples. Although the method 400 is described in conjunction with the system 200, the method 400 could be used with other systems and devices. In addition, the method 400 may be modified or performed differently than the specific example provided.

As noted, the method 400 is described as being performed by the camera system 200 and, in particular, the electronic processor 210. However, it should be understood that in some instances, portions of the method 400 may be performed by other devices, including for example, the electronic communications device 106. Additional electronic processors may also be included in the camera system 200 that perform all or a portion of the method 400. For ease of description, the method 400 is described in terms of a single camera system (for example, the camera system 200) and a single object. However, the method 400 may be applied to multiple camera systems and/or multiple devices. The method 400 may also be applied to more than one object (for example, simultaneously).

At block 402, the electronic processor 210 monitors, via the energy wave sensor 245A, for an object within the FOV 102A. As mentioned above, in some examples a portion of the FOV 102A of the energy wave sensor 245A includes an area below the system 200 or the camera 245B, an area behind the system 200 or the camera 245B, or both (for example, as shown in FIG. 1A).

At block 404, the electronic processor 210 determines an object type of an object detected within the FOV 102A of the energy wave sensor 245A (for example, according to one or more classifiers as part of an object recognition process). The processor 210 determines whether the object type of the object is, or likely is, a vehicle at block 406 (for example, the vehicle 104A) or a person (for example, person 104B) at block 410. An object type may be determined via electromagnetic radiation information from the sensor 245A based on derived characteristics from the received reflected electromagnetic radiation off of the object as generally described above. For example, an approximate object size, shape, height, velocity, direction of travel, and distance from camera system 200 may be determined based on the received sensor 245A data. Based on this information, the electronic processor 210 determines a particular object type of the detected object via one or more object detection/recognition algorithms.

The processor 210 may detect and determine an object type of an object when the object enters or is within a predefined area (e.g., a "detection area") within the FOV 102A. For example, returning to FIG. 1B, the processor 210 may only evaluate object types of objects within a detection area 110 of the FOV 102A rather than the entire FOV 102A of the energy wave sensor 245A. This may be done, for example, to minimize processing power of the system 200 and, thus, conserve system power.

The particular location of the detection area 110 may be relative to a positioning of the FOV 102A of the energy wave sensor 245A with respect to a positioning of the FOV 102B of the camera 245B. The area 110 is defined, for example, to capture an object approaching the FOV 102B from an area within the FOV 102A. In instances where the FOV 102A and the FOV 102B overlap at least partially, the detection area 110 may be defined in an area within the FOV 102A that does not overlap (or mostly does not overlap) with the FOV 102B. In some examples, the detection area 110 is defined based on a flow of traffic of a road within the FOV 102A. For example, as shown in FIG. 1B, the detection area 110 is positioned within a first lane 112 of a road 114. The flow of traffic of the lane 112, in the illustrated example, is defined as moving towards the FOV 102B of the camera 245B from the FOV 102A.

In some examples, the processor 210 is configured to evaluate a sub-portion of the FOV 102A for whether the object type of a detected object is specifically a person and may not perform other object recognition evaluations to determine whether the object is a different, specific object type (for example, a vehicle). This sub-portion may be, for example, an area below and/or behind the system 200/camera 245B. Again, this may be done to minimize processing power of the system 200 and, thus, conserve system power.

Returning to FIG. 4, in response to determining that the object type of the object is a vehicle (for example, the vehicle 104A), the electronic processor 210 transitions the camera 245B from the low-power mode to the active mode and captures, via the camera 245B, an image of the vehicle 104A (block 408). In instances where the object type of the object is a person (for example, the person 104B), the electronic processor 210 performs a tamper-monitoring action when the person is within (or enters) a first predetermined range (of a plurality of predetermined ranges) of the system 200. It should be understood that the particular predetermined range(s) described below are dependent on the mounting height (vertical distance x (FIG. 1A)) from the ground at which the camera system 200 is positioned. For example, the predetermined range may be larger in relation to the vertical distance x when the vertical distance x is shorter and vice versa. For example, in instances where the mounting height (vertical distance x) is approximately 10 ft, the predetermined range may be set to approximately 5 ft from a base of the pole/post that the system 200 is mounted on. In instances where the mounting height (vertical distance x) is larger (for example, approximately 20 ft) the predetermined range may be smaller (for example, the range limit may be set to be closer to approximately 1 ft from the base of the pole/post). The predetermined range may be defined as a spatial area relative to a center of the system 200 or relative to the bottom of the pole/post that the system 200 is mounted on.

The tamper-monitoring action, as explained in more detail below, is an action performed by the system 200 to prevent and/or alert one or more parties (for example, a person proximate to the system 200 and/or a user of the electronic communications device 106) of a possible tampering attempt by an individual (e.g., the person determined at block 410).

The tampering-monitoring action may include generating an audible alert (for example, via a speaker (not shown) of the system 200. The tampering-monitoring action may include transmitting a notification to another device (for example, the electronic communications device 106) alerting a user of the tampering attempt. The notification may include additional information to aid the user in identifying and locating the camera system 200 (for example, information regarding the location of the system 200, a unique identifier assigned to the particular camera system 200, image and/or energy wave sensor information captured by the camera 245B and/or the energy wave sensor 245A, respectively, audio information captured by the microphone 245C, and the like).

In some examples, the tamper-monitoring action includes a verification step to verify a likelihood that the detected person will attempt to tamper with the camera system 200. For example, a person intending to tamper with the system 200 may remain close to and/or advance closer to the system 200 to examine it and/or to attempt to reach it. Accordingly, in some examples, the tamper-monitoring action includes determining whether the person is (a) stationary for a predetermined amount of time (for example, approximately one to five minutes) while within the first predetermined range of the camera system 200 or (b) moves within a second predetermined range of the system 200, the second predetermined range being less than the first predetermined range. In some examples, the second predetermined range is defined as a distance down the pole/post that the camera system is mounted on from the camera system 200. In other examples, the second predetermined range is a distance from the base of the pole/post.

As another example of a verification step within the tamper-monitoring action, in some examples, the camera system 200 further includes a second camera (not shown) with a FOV that is within the FOV 102A (and, in some instances, smaller than the FOV 102A) of the energy wave sensor 245A. In such instances, the tamper-monitoring action includes capturing an image of the person within the FOV of the second camera via the second camera when the person enters the FOV of the second camera. The second camera may be a lower quality (and lower powered) camera compared to the camera 245B and have a FOV that is smaller than that of the FOV 102B of the camera 245B. The second camera may be configured to operate along with the energy wave sensor 245A while the camera 245B is in the low-power mode. In some instances, the second camera may also operate in a low-power mode and transition into an active mode in response to the processor 210 determining that the object type of the object is a person and capture an image of the person as part of the tamper-monitoring action performed at block 412 of the method 400.

In some instances, it may be desirable to momentarily bypass or delay generating an alert when the detected person is authorized to handle the camera system 200 (for example, a public safety officer retrieving the system 200 and/or a worker to perform an authorized maintenance on the system 200). Thus, in some examples, the tamper-monitoring action may include verifying whether an authorization request has been received (for example, via the transceiver 230) and delaying or bypassing generating an alert (as described above) when the person is within the first predetermined range based on the authorization request. The authorization request may be transmitted to the camera system 200, for example, by the electronic communications device 106. The request may be generated and sent by a user of the electronic communications device 106 or, in some examples, is generated based on an electronic calendar of a user. The request may include a particular time and/or date in which the camera system 200 is to bypass or delay generating an alert. The camera system 200, in response, may accordingly bypass or delay generating an alert (and/or one or more other steps of the tamper-prevention action described above) based on the time and/or date information. In some instances, the camera system 200, is configured to receive an authorization request based on an image captured within the second field of view via a second camera of the system 200 (for example, the second camera described above). A person, for example, approaching the system 200 may present a visual authorization code (for example, a barcode, quick response (QR) code, a unique text passcode, etc.) to the second camera (for example, on a display of a device). The second camera may capture an image of the visual authorization code and the processor 210 may determine, based on the captured code, whether the person is authorized to handle the camera system 200. The verification may be performed entirely based on prestored information (for example, one or more passwords, authorized user identifiers, etc.) within the memory 220 of the camera system 200 or the system 200 may forward the information to another device (for example, the electronic communications device 106) and the verification is performed at that device. The results of the verification are returned to the camera system 200 and, if positive, the system 200 accordingly bypasses/delays generating an alert or notification.

In instances where the object type is determined to be neither that of a vehicle nor a person, the camera 245B may still be activated to capture image information of the object. However, in the illustrated example, the method 400 simply returns to block 402. Following blocks 408 and 412, the method 400 also returns to block 402.

In some examples, the processor 210 is configured to evaluate more than one object in the FOV 102A for whether the object types, for example, of detected objects are a person and/or a vehicle. The processor 210 may, in other words, simultaneously perform the method 400 on a second object within the FOV 102A. In some instances, the camera system 200 will track multiple identified objects simultaneously while treating each detected object separately in determining camera system 200 actions. For example, the energy wave sensor 245A may detect a vehicle in a first portion of the FOV 102A and a person in a second portion of FOV 102A. The system 200, in response to the detection of the vehicle, may be configured to cause the camera 245B to transition into active mode, while, in response to the detection of the person, simultaneously cause the camera system 200 to perform a tamper-monitoring action described above.

Based on the provided description, a person of ordinary skill in the pertinent art will readily understand how to make various modifications and changes without any undue experimentation and without departing from the scope of the invention as set forth in the claims below. Accordingly, the specification and figures are to be regarded in an illustrative rather than a restrictive sense, and all such modifications are intended to be included within the scope of present teachings. Furthermore, all examples recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions. Moreover, all statements herein reciting principles, aspects, features, examples, and embodiments of the disclosure, as well as specific examples thereof, are intended to encompass equivalents thereof.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A portable deployable camera system, the system comprising:
    a camera with a first field of view, the camera configured to operate in a low-power mode and an active mode;
    an energy wave sensor with a second field of view that is different than the first field of view; and
    an electronic processor configured to:
        monitor, via the energy wave sensor, for an object within the second field of view,
        determine an object type of the object,
        in response to determining that the object type of the object is a vehicle, transition the camera from the low-power mode to the active mode and capture, via the camera, an image of the vehicle, and
        in response to determining that the object type of the object is a person, perform a tamper-monitoring action when the person is within a first predetermined range of a plurality of predetermined ranges of the system.

2. The system of claim 1, wherein the tamper-monitoring action includes determining whether the person is (a) stationary for a predetermined amount of time or (b) moves within a second predetermined range of the plurality of predetermined ranges of the system, wherein the second predetermined range is less than the first predetermined range.

3. The system of claim 1, wherein the second field of view includes an area below the camera.

4. The system of claim 1, wherein the second field of view includes an area behind the camera.

5. The system of claim 1, wherein the system further includes a second camera with a third field of view that is within the second field of view, and wherein the tamper-monitoring action further includes capturing an image of the person within the third field of view via the second camera.

6. The system of claim 5, wherein the third field of view that is smaller than the first field of view of the camera.

7. The system of claim 5, wherein the electronic processor is further configured to transition the second camera from a low-power mode to an active mode to capture the image of the person.

8. The system of claim 1, wherein
performing the tamper-monitoring action includes
verifying whether an authorization request has been received, and
delaying or bypassing generating an alert when the person is within the first predetermined range based on the authorization request.

9. The system of claim 8, wherein the authorization request is received based on an image captured within the second field of view via a second camera of the system.

10. The system of claim 1, wherein the electronic processor is further configured to:
detect, within the second field of view, a second object in addition to the object,
determine an object type of the second object,
in response to determining that the object type of the second object is a vehicle, transition the camera from the low-power mode to the active mode and capture, via the camera, an image of the second object, and
in response to determining that the object type of the second object is a person, perform the tamper-monitoring action when the second object is within the first predetermined range of the plurality of predetermined ranges of the system.

11. A method for reducing tampering of a portable deployable camera system including a camera with a first field of view, the camera configured to operate in a low-power mode and an active mode, and an energy wave sensor with a second field of view that is different than the first field of view, the method comprising:
monitoring, via the energy wave sensor, for an object within the second field of view,
determining an object type of the object,
in response to determining that the object type of the object is a vehicle, transitioning the camera from the low-power mode to the active mode and capture, via the camera, an image of the vehicle, and
in response to determining that the object type of the object is a person, performing a tamper-monitoring action when the person is within a first predetermined range of a plurality of predetermined ranges of the system.

12. The method of claim 11, wherein the tamper-monitoring action includes determining whether the person is (a) stationary for a predetermined amount of time or (b) moves within a second predetermined range of the plurality of predetermined ranges of the system, wherein the second predetermined range is less than the first predetermined range.

13. The method of claim 11, wherein the second field of view includes an area below the camera.

14. The method of claim 11, wherein the second field of view includes an area behind the camera.

15. The method of claim 11, wherein the system further includes a second camera with a third field of view that is within the second field of view, and wherein the tamper-monitoring action further includes capturing an image of the person within the third field of view via the second camera.

16. The method of claim 15, wherein the third field of view that is smaller than the first field of view of the camera.

17. The method of claim 15, the method further comprising transitioning the second camera from a low-power mode to an active mode to capture the image of the person.

18. The method of claim 11, wherein performing the tamper-monitoring action includes
verifying whether an authorization request has been received, and
delaying or bypassing generating an alert when the person is within the first predetermined range based on the authorization request.

19. The method of claim 18, wherein the authorization request is received based on an image captured within the second field of view via a second camera of the system.

20. The method of claim 11, the method further comprising:
detecting, within the second field of view, a second object in addition to the object,
determining an object type of the second object,
in response to determining that the object type of the second object is a vehicle, transitioning the camera from the low-power mode to the active mode and capture, via the camera, an image of the second object, and
in response to determining that the object type of the second object is a person, performing the tamper-monitoring action when the second object is within the first predetermined range of the plurality of predetermined ranges of the system.

* * * * *